(12) United States Patent
Tong et al.

(10) Patent No.: US 7,508,798 B2
(45) Date of Patent: Mar. 24, 2009

(54) VIRTUAL MIMO COMMUNICATION SYSTEM

(75) Inventors: Wen Tong, Ottawa (CA); Jianglei Ma, Kanata (CA); Peiying Zhu, Kanata (CA); Ming Jia, Ottawa (CA); Dong-Sheng Yu, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1076 days.

(21) Appl. No.: 10/321,999

(22) Filed: Dec. 16, 2002

(65) Prior Publication Data

US 2004/0114618 A1    Jun. 17, 2004

(51) Int. Cl.
*H04Q 11/00* (2006.01)
(52) U.S. Cl. .................. 370/337; 370/342; 370/343; 370/345; 455/452.1; 455/500; 375/299
(58) Field of Classification Search ............ 370/335, 370/336, 337, 342, 203, 208, 343, 345, 465, 370/91; 455/452.1, 500; 375/299
See application file for complete search history.

(56) References Cited

U.S. PATENT DOCUMENTS

| | | | | |
|---|---|---|---|---|
| 6,016,311 | A * | 1/2000 | Gilbert et al. | 370/280 |
| 6,473,467 | B1 * | 10/2002 | Wallace et al. | 375/267 |
| 6,662,024 | B2 * | 12/2003 | Walton et al. | 455/562.1 |
| 6,724,813 | B1 * | 4/2004 | Jamal et al. | 375/219 |
| 6,741,587 | B2 * | 5/2004 | Holma et al. | 370/362 |
| 6,859,503 | B2 * | 2/2005 | Pautler et al. | 375/299 |
| 6,928,062 | B2 * | 8/2005 | Krishnan et al. | 370/329 |
| 6,958,989 | B1 * | 10/2005 | Dick et al. | 370/342 |
| 6,985,434 | B2 * | 1/2006 | Wu et al. | 370/208 |

(Continued)

FOREIGN PATENT DOCUMENTS

| | | |
|---|---|---|
| EP | 0993129 A2 | 4/2000 |
| EP | 1265376 A2 | 12/2002 |
| WO | 02/091597 | 11/2002 |

OTHER PUBLICATIONS

Garnier, C. et al., "Performance of an OFDM-SDMA based System in a Time-Varying Multi-Path Channel," 2001, p. 1686-1690.

(Continued)

*Primary Examiner*—Hassan Kizou
*Assistant Examiner*—Brian T O'Connor
(74) *Attorney, Agent, or Firm*—Withrow & Terranova, P.L.L.C.

(57) ABSTRACT

The present invention provides an effective way to create a virtual MIMO transmission system using mobile terminals that have only one transmit path and antenna. This is accomplished by assigning mobile terminals to a group and assigning certain shared resources and user-specific resources to those mobile terminals in the group. In a synchronized fashion, the mobile terminals will provide uplink transmission in concert, as if they were a single entity having multiple transmission paths and antennas. Preferably, the shared resources bear on how the data is transmitted, and the user-specific resources relate to pilot signals. The data transmitted may be encoded in any number of ways, and in one embodiment, the mobile terminals may relay their information to each other, such that uplink transmissions can incorporate STTD decoding or other space-time codes. The invention is applicable to virtually any multiple access technology, including OFDM, TDMA, and CDMA, preferably synchronous CDMA.

58 Claims, 17 Drawing Sheets

U.S. PATENT DOCUMENTS

| | | | |
|---|---|---|---|
| 7,020,110 B2* | 3/2006 | Walton et al. | 370/334 |
| 7,042,856 B2* | 5/2006 | Walton et al. | 370/329 |
| 7,047,016 B2* | 5/2006 | Walton et al. | 455/452.1 |
| 7,095,709 B2* | 8/2006 | Walton et al. | 370/208 |
| 7,095,722 B1* | 8/2006 | Walke et al. | 370/315 |
| 7,164,649 B2* | 1/2007 | Walton et al. | 370/203 |
| 7,299,070 B2* | 11/2007 | Karaoguz et al. | 455/562.1 |
| 7,328,025 B2* | 2/2008 | Jechoux | 455/452.1 |
| 7,372,912 B2* | 5/2008 | Seo et al. | 375/267 |
| 7,394,860 B2* | 7/2008 | Tong et al. | 375/267 |
| 7,397,864 B2* | 7/2008 | Tarokh et al. | 375/299 |
| 2002/0146060 A1 | 10/2002 | Ertel et al. | 375/130 |
| 2002/0177447 A1 | 11/2002 | Walton et al. | 455/452 |
| 2003/0223516 A1* | 12/2003 | Zhang et al. | 375/346 |
| 2005/0002467 A1* | 1/2005 | Seo et al. | 375/267 |

OTHER PUBLICATIONS

Vandenameele, Patrick et al., "A Combined OFDM/SDMA Approach," IEEE Journal on Selected Areas in Communications, vol. 18 No. 11, Nov. 2000.

International Search Report for PCT/IB 03/05947, mailed Jun. 25, 2004.

Alamouti, Siavash M., "A Simple Transmit Diversity Technique for Wireless Communications," IEEE Journal on Selected Areas in Communications, vol. 16, No. 8, Oct. 1998, pp. 1451-1458, XP002100058.

Baltersee, Jens et al., "Achievable Rate of MIMO Channels With Data-Aided Channel Estimation and Perfect Interleaving," IEEE Journal on Selected Areas in Communications, vol. 19, No. 12, Dec. 2001, pp. 2358-2368, XP2359126A.

Laneman, J. Nicholas, "Cooperative Diversity in Wireless Networks: Algorithms and Architectures," Massachusetts Institute of Technology, Boston, MA, Sep. 2002, http://allegro.mit.edu/pubs/posted/doctoral/2002-laneman-phd.pdf.

Laneman, J. Nicholas and Wornell, Gregory W., "Distributed Space-Time Coded Protocols for Exploiting Cooperative Diversity in Wireless Networks," IEEE Global Telecommunications Conference, Proceedings, Taipei, Taiwan, vol. 1 of 3, Nov. 2002, XP010635917.

* cited by examiner

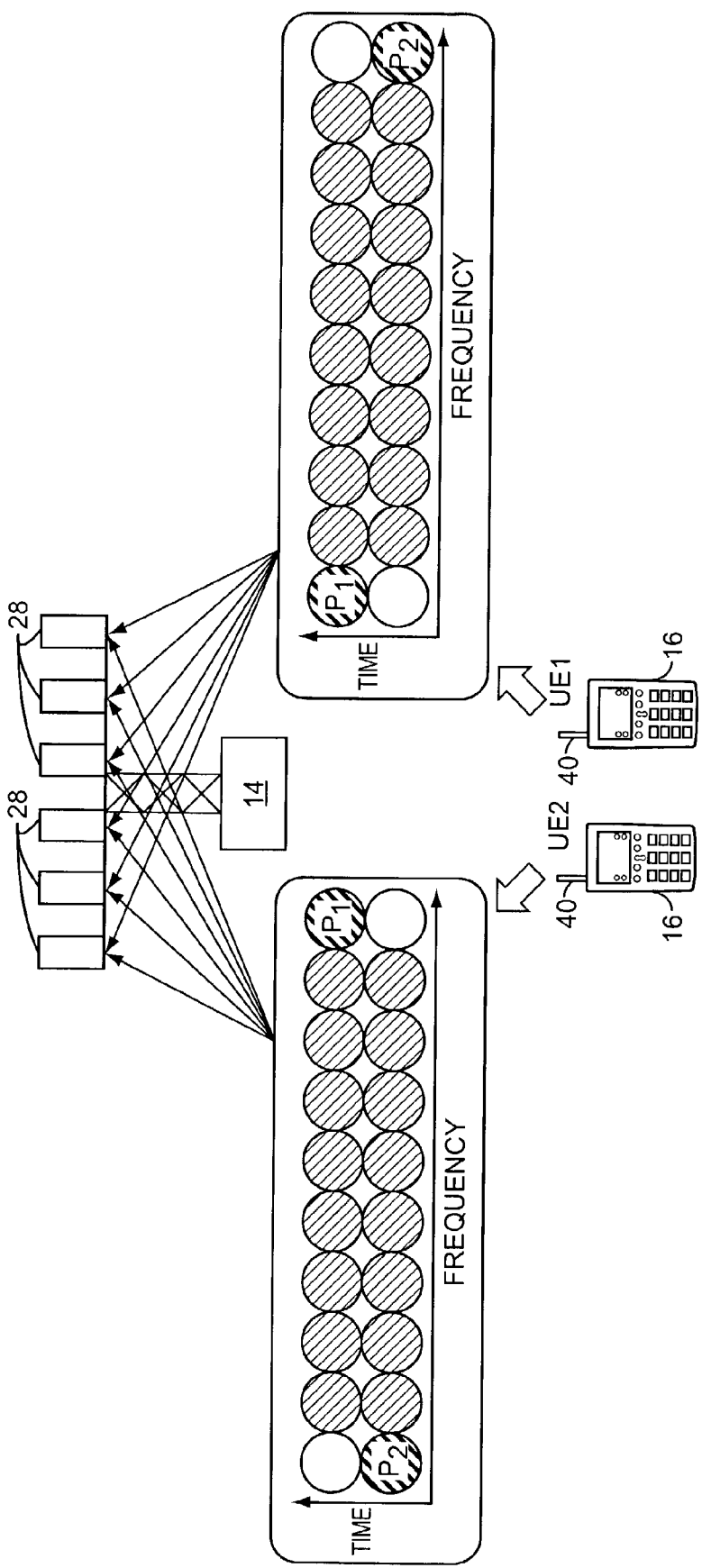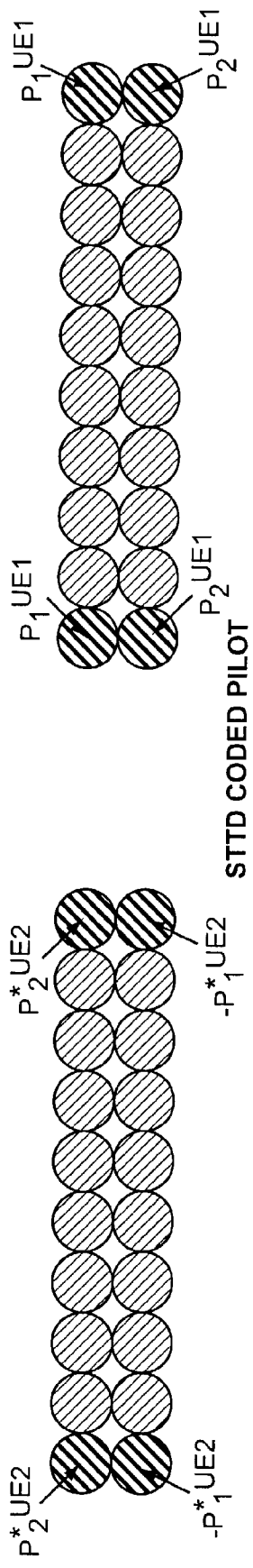
FIG. 8A
FIG. 8B
STTD CODED PILOT

FIG. 9B STTD CODED PILOT

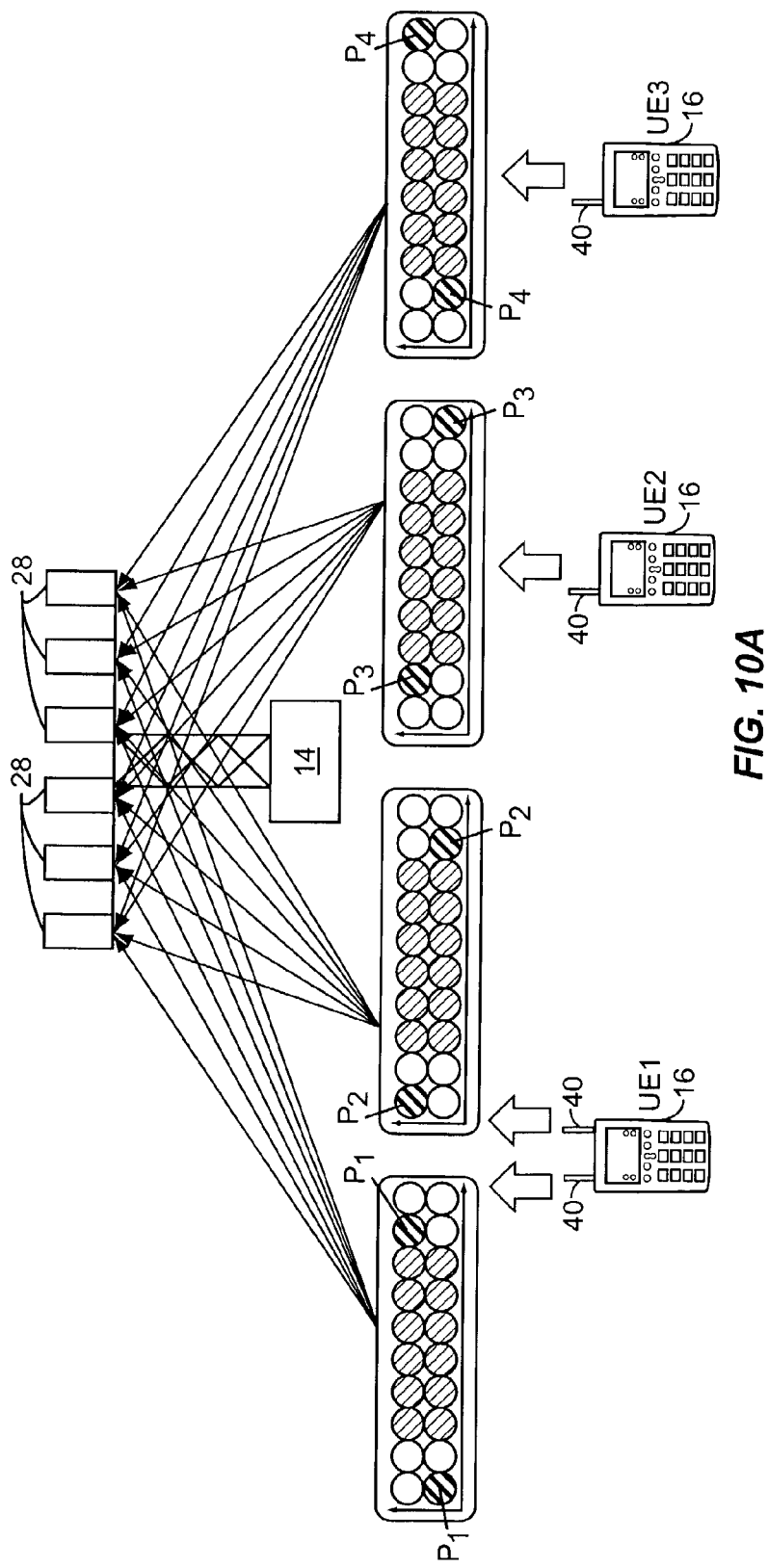
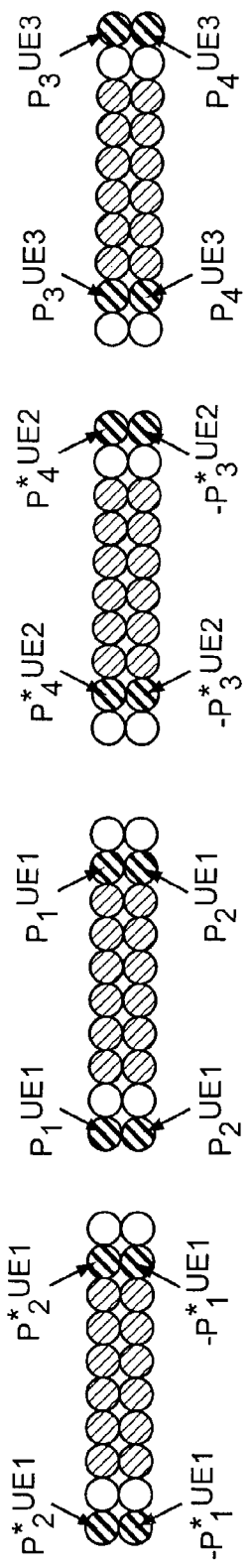
FIG. 10A
STTD CODED PILOT
FIG. 10B

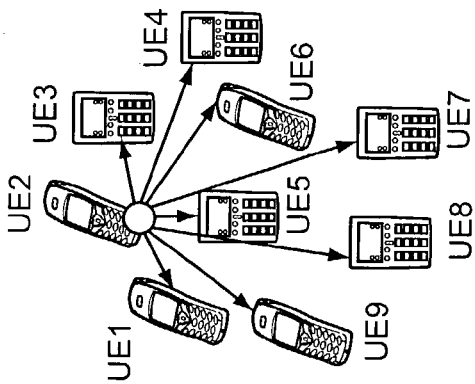
FIG. 13C
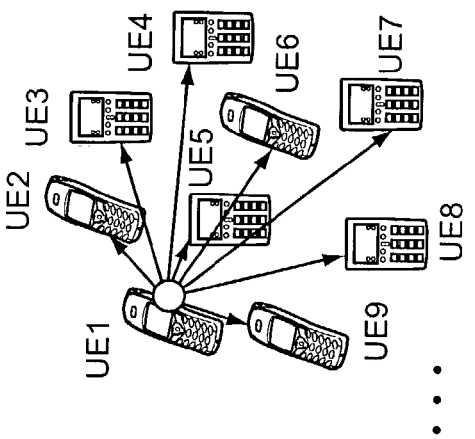
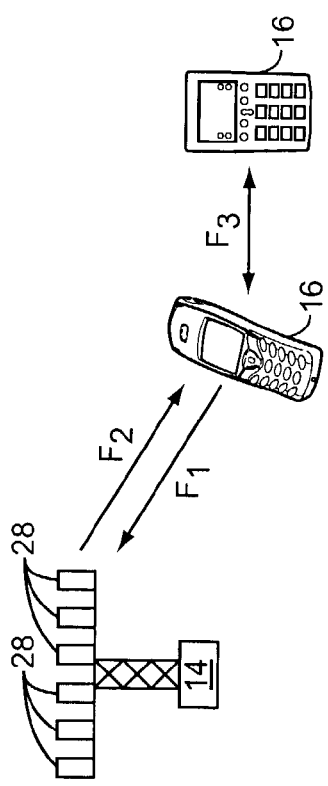
FIG. 13A
FIG. 13B

US 7,508,798 B2

VIRTUAL MIMO COMMUNICATION SYSTEM

FIELD OF THE INVENTION

The present invention relates to communications, and more particularly relates to providing a virtual multiple input multiple output communication environment using mobile terminals having only a single transmission path and antenna.

BACKGROUND OF THE INVENTION

With the ever-increasing demand for wireless transmission capacity, be it the number of users able to access a system or the speed at which data is transferred, multiple input multiple output (MIMO) architectures have evolved. MIMO architectures incorporate multiple antennas for transmission and multiple receivers for reception. In combination with various coding techniques, the spatial diversity provided by MIMO systems provides for significant increases in the number of users that can access a system at any given time, as well as the amount of data that can be transmitted over a given period of time. Unfortunately, the nature of mobile communications dictates the need for inexpensive mobile terminals, such as mobile telephones, wireless personal digital assistants (PDAs), and the like. Implementing multiple antennas and transmission paths within mobile terminals significantly increases their complexity, and thus price. To date, the price associated with providing multiple antennas and transmission paths in mobile terminals has significantly outweighed the benefit of more capacity, at least from the consumer's perspective.

Most base stations are already equipped with multiple antennas and receivers, and given the nature of such infrastructure, the cost of providing such has proven largely insignificant. Thus, there exists a wireless infrastructure capable of facilitating MIMO-based communication, yet consumers are unwilling to bear the cost of completing the MIMO environment by buying properly equipped mobile terminals. As such, there is a need to reap the benefit of MIMO-based communications without requiring mobile terminals to have multiple antennas and transmission paths.

SUMMARY OF THE INVENTION

The present invention provides an effective way to create a virtual MIMO transmission system using mobile terminals that have only one transmit path and antenna. This is accomplished by assigning mobile terminals to a group and assigning certain shared resources and user-specific resources to those mobile terminals in the group. In a synchronized fashion, the mobile terminals will provide uplink transmission in concert, as if they were a single entity having multiple transmission paths and antennas. Preferably, the shared resources bear on how the data is transmitted, and the user-specific resources relate to pilot signals. The data transmitted may be encoded in any number of ways, and in one embodiment, the mobile terminals may relay their information to each other, such that uplink transmissions can incorporate STTD decoding or other space-time codes. The invention is applicable to virtually any multiple access technology, including OFDM, TDMA, and CDMA, preferably synchronous CDMA.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 8A and 8B illustrate a first OFDM virtual MIMO environment according to the present invention.

FIGS. 9A and 9B illustrate a second OFDM virtual MIMO environment according to the present invention.

FIGS. 10A and 10B illustrate a third OFDM virtual MIMO environment according to the present invention.

FIGS. 13A-13C illustrate out-of-band relay of information between mobile terminals according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
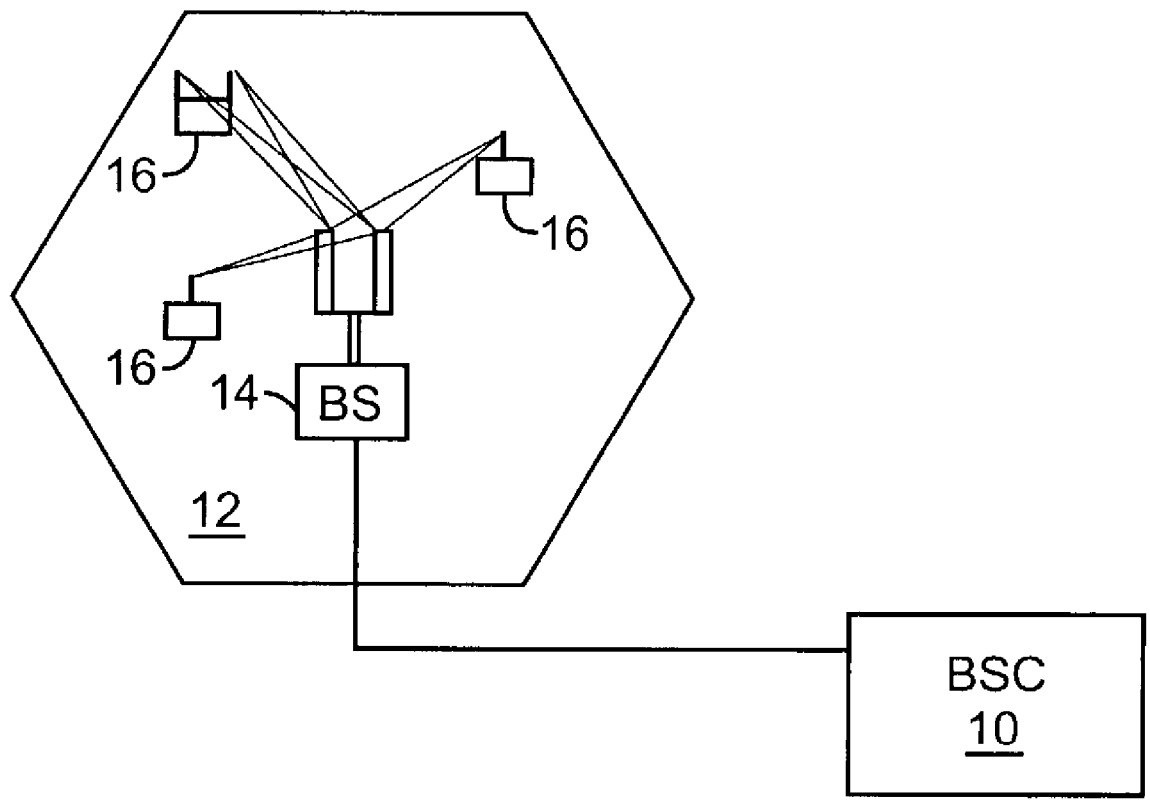
FIG. 1 is a block representation of a wireless communication environment according to one embodiment of the present invention.

With reference to FIG. 1, a basic wireless communication environment is illustrated. In general, a base station controller (BSC) 10 controls wireless communications within multiple cells 12, which are served by corresponding base stations (BS) 14. Each base station 14 facilitates communications with mobile terminals 16, which are within the cell 12 associated with the corresponding base station 14. For the present invention, the base stations 14 include multiple antennas to provide spatial diversity for communications. The mobile terminals 16 may or may not have multiple antennas, depending on the implementation of the present invention.

Figure 2:
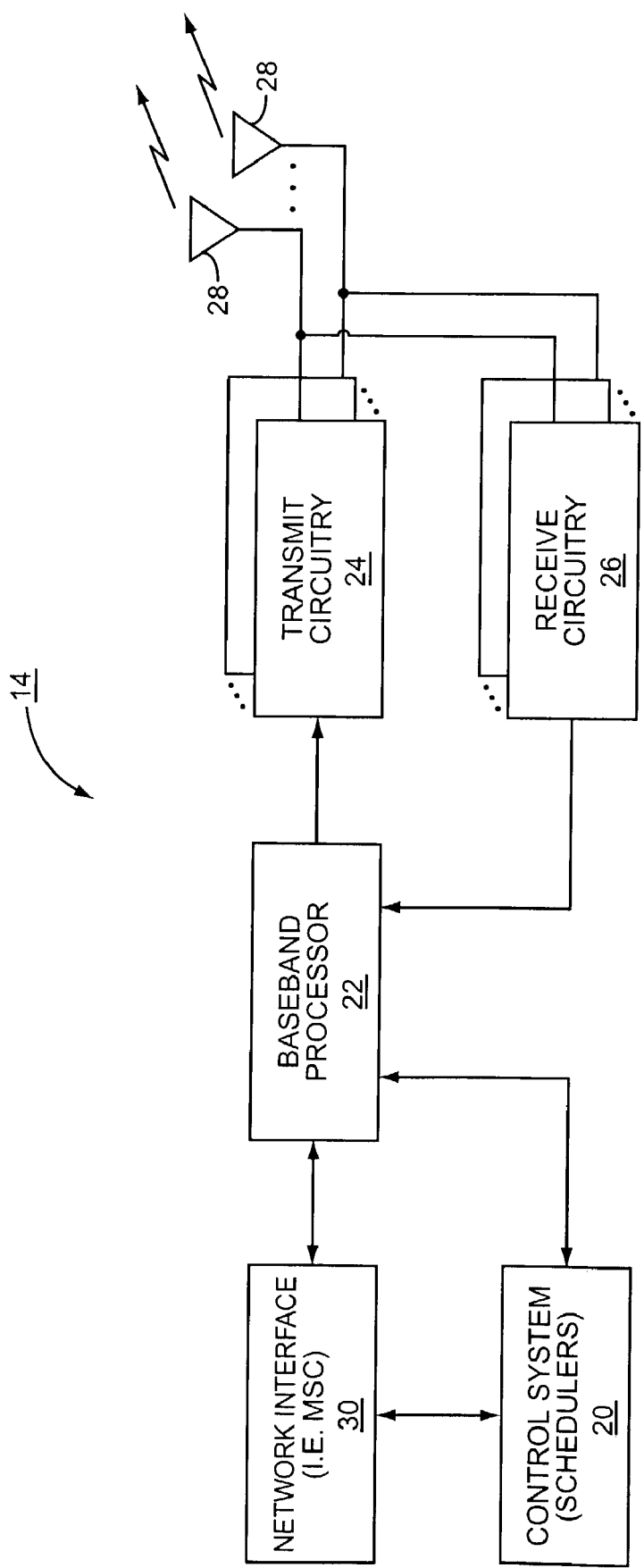
FIG. 2 is a block representation of a base station according to one embodiment of the present invention.

With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through the antennas 28 bearing information from one or more remote transmitters provided by mobile terminals 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another mobile terminal 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of the control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Modulation and processing details are described in greater detail below.

Figure 3:
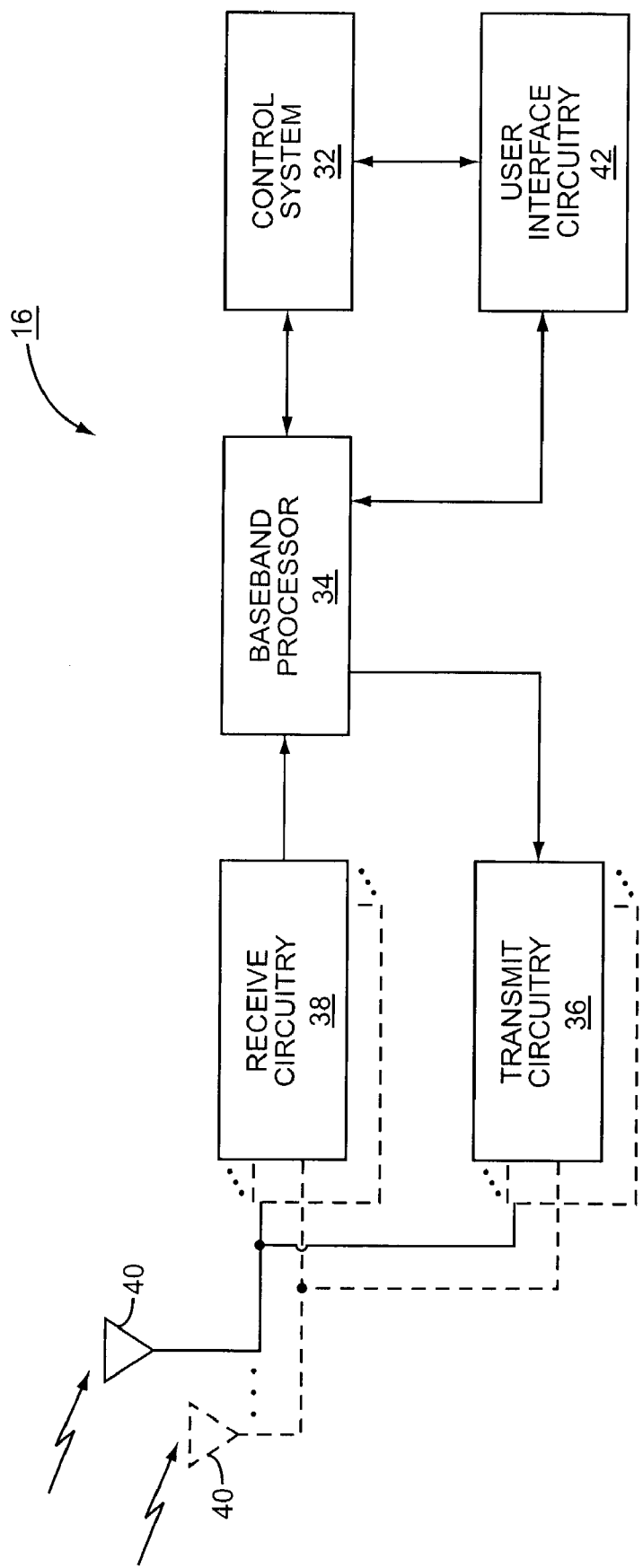
FIG. 3 is a block representation of a mobile terminal according to one embodiment of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, antenna 40, and user interface circuitry 42. The receive circuitry 38 receives radio frequency signals through the antenna 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antenna 40 through a matching network (not shown). In select embodiments, multiple antennas 40 and replicated transmit and receive circuitries 36, 38 provide spatial diversity. Modulation and processing details are described in greater detail below.

Figure 4:
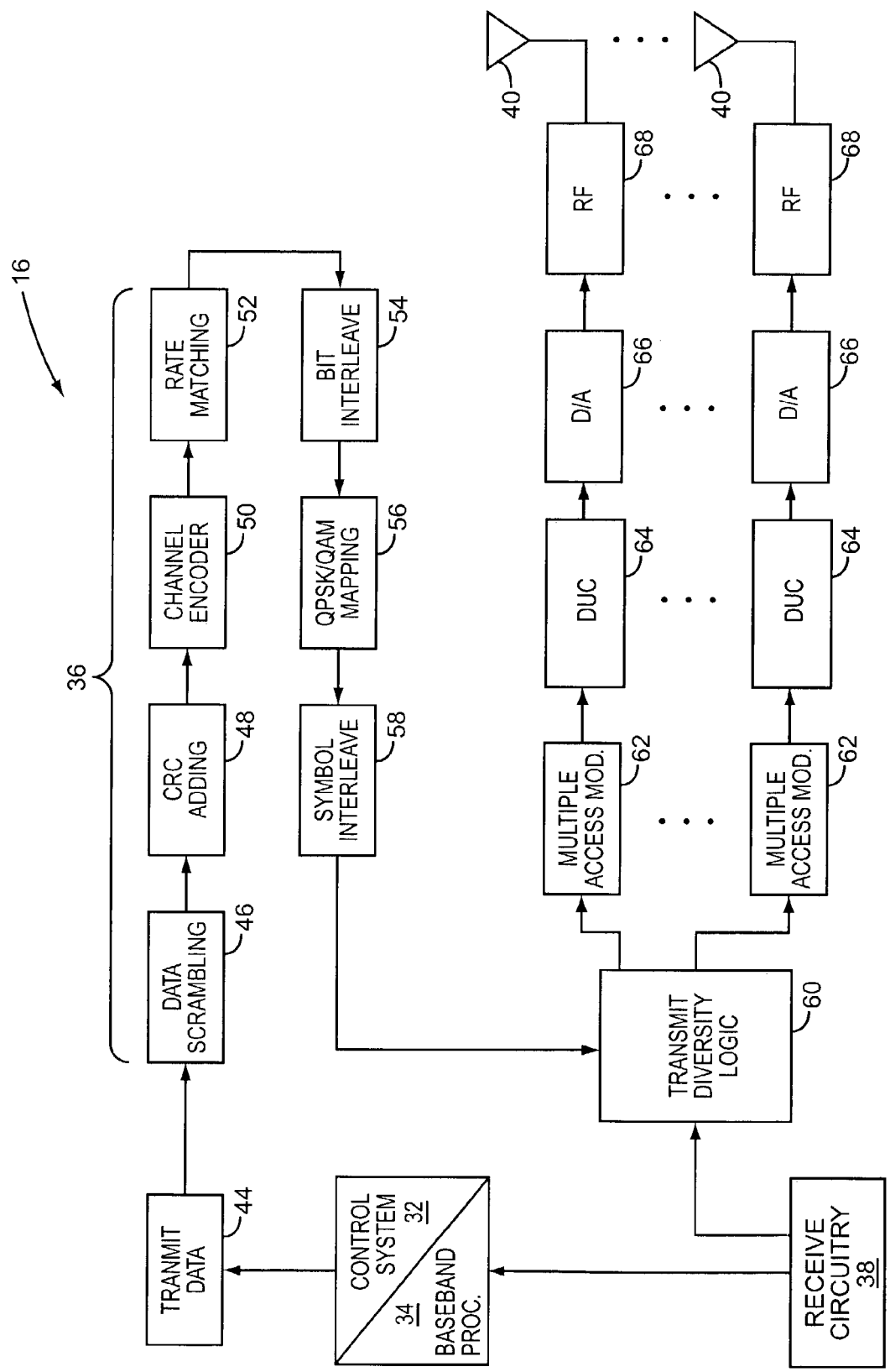
FIG. 4 is a more detailed logical representation of a mobile terminal according to one embodiment of the present invention.

With reference to FIG. 4, a logical transmission architecture is provided according to one embodiment of the present invention. The transmission architecture is described as being that of the mobile terminal 16, but those skilled in the art will recognize the applicability of the illustrated architecture for both uplink and downlink communications in a variety of wireless environments. Further, the transmission architecture is intended to represent a variety of multiple access architectures, including, but not limited to orthogonal frequency division multiplexing (OFDM), code division multiple access (CDMA), frequency division multiple access (FDMA), and time division multiple access (TDMA).

Data to be transmitted 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, a form of Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation and are ready to be modulated, as dictated by transmit diversity logic 60, by the multiple access modulation function 62. As illustrated in dashed lines, the mobile terminal 16 may provide multiple transmit paths to provide spatial diversity. Those skilled in the art will recognize that one or more processors may be used to provide such analog or digital signal processing, alone or in combination with other processing described herein. For example, the multiple access modulation function 62 in a CDMA function would provide the requisite pilot, PN, and scrambling code multiplication, wherein an OFDM function would operate on the respective symbols using inverse discrete Fourier transform (IDFT) or like processing to effect an Inverse Fourier Transform. Attention is drawn to co-assigned application Ser. No. 10/104,399, filed Mar. 22, 2002 for additional OFDM details, and to *RF Microelectronics* by Behzad Razavi, 1998 for details regarding CDMA and other multiple access technologies, both of which are incorporated herein by reference in their entireties.

Each of the resultant signals is up-converted in the digital domain to an intermediate frequency and converted to an analog signal via the corresponding digital up-conversion (DUC) circuitry 64 and digital-to-analog (D/A) conversion circuitry 66. The resultant analog signals are then simultaneously modulated at the desired RF frequency, amplified, and transmitted via RF circuitry 68 and antenna(s) 40. Notably, the transmitted data may include pilot signals, which were previously assigned by the base station 14. The base station 14, which is discussed in detail below, may use the pilot signals for channel estimation and interference suppression, as well as to identify the mobile terminal 16.

Figure 5:
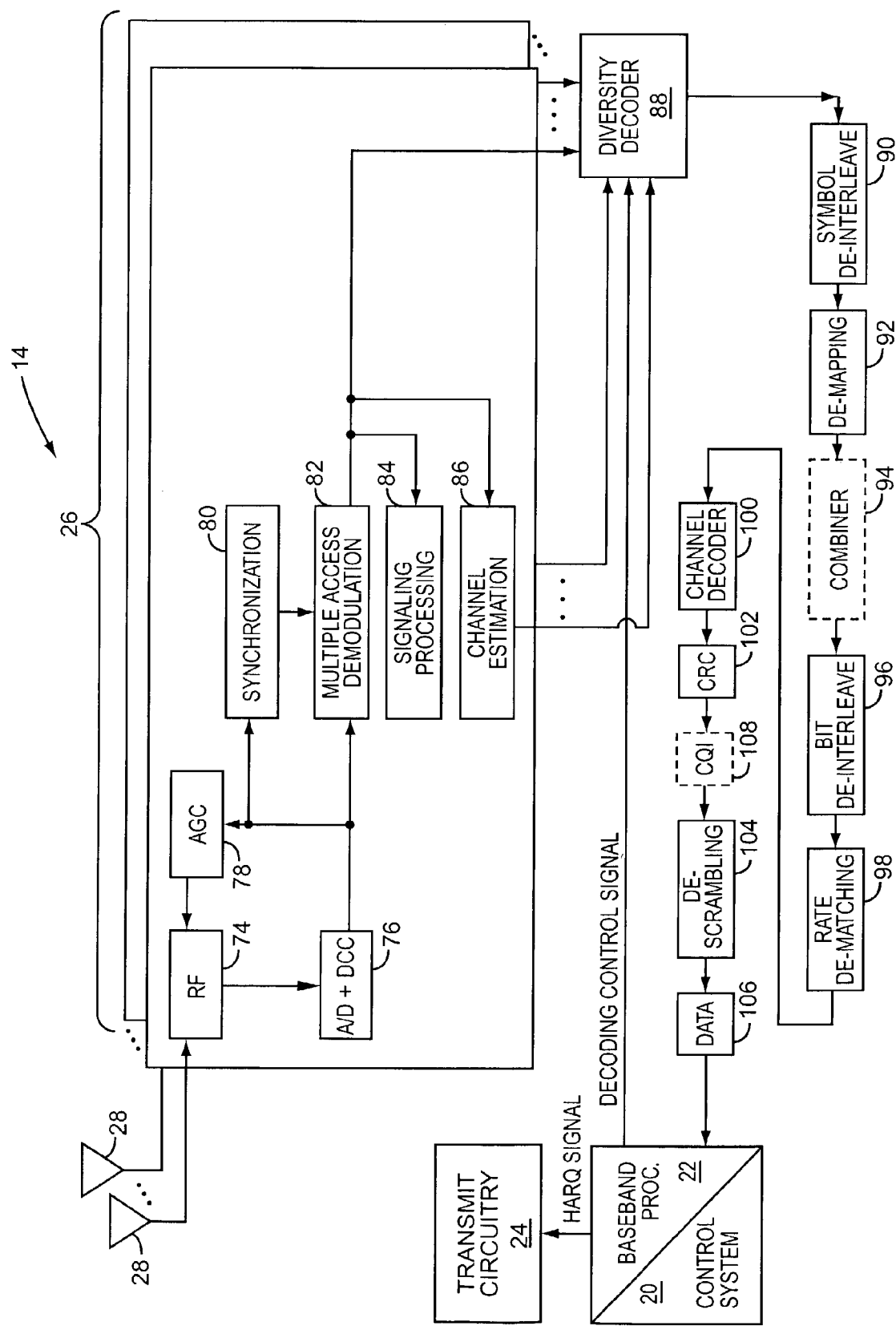
FIG. 5 is a more detailed logical representation of a base station according to one embodiment of the present invention.

Reference is now made to FIG. 5 to illustrate reception of the transmitted signals by a base station 14. Upon arrival of the transmitted signals at each of the antennas 28 of the base station 14, the respective signals are demodulated and amplified by corresponding RF circuitry 74. For the sake of conciseness and clarity, only one of the multiple receive paths in the receiver is described and illustrated in detail. Analog-to-digital (A/D) conversion and downconversion circuitry (DCC) 76 digitizes and downconverts the analog signal for digital processing. The resultant digitized signal may be used by automatic gain control circuitry (AGC) 78 to control the gain of the amplifiers in the RF circuitry 74 based on the received signal level.

The digitized signal is also fed to synchronization circuitry 80 and a multiple access demodulation function 82, which will recover the incoming signal received at a corresponding antenna 28 at each receiver path. The synchronization circuitry 80 facilitates alignment or correlation of the incoming signal with the multiple access demodulation function 82 to aid recovery of the incoming signal, which is provided to a signaling processing function 84 and channel estimation function 86. The signal processing function 84 processes basic signaling and header information to provide information sufficient to generate a channel quality measurement, which may bear on an overall signal-to-noise ratio for the link, taking into account channel conditions and/or signal-to-noise ratios for each receive path.

The channel estimation function 86 for each receive path provides channel responses corresponding to channel conditions for use by a diversity decoder 88. The symbols from the incoming signal and channel estimates for each receive path are provided to the diversity decoder 88. The channel estimates provide sufficient channel response information to allow the diversity decoder 88 to decode the symbols according to the transmission and/or encoding used by the mobile terminal 16.

The recovered symbols are placed back in order using symbol de-interleaver logic 90, which corresponds to the symbol interleaver logic 58 of the base station 14. The de-interleaved symbols are then demodulated or de-mapped to a corresponding bitstream using de-mapping logic 92. Depending on the configuration of the receiver architecture, combiner logic 94, such a Chase combiner, which is well known in the art, may optionally be included to combine the energy associated with parallel receive channels to arrive at a soft decision for each bit or group of bits. The bits are then de-interleaved using bit de-interleaver logic 96, which corresponds to the bit interleaver logic 54 of the transmitter architecture. The de-interleaved bits are then processed by rate de-matching logic 98 and presented to channel decoder logic 100 to recover the initially scrambled data and the CRC checksum. Accordingly, CRC logic 102 removes the CRC checksum, checks the scrambled data in traditional fashion, and provides it to de-scrambling logic 104 for de-scrambling using the known base station de-scrambling code to recover the originally transmitted data 106.

A channel quality indicator (CQI) may be determined based on the recovered data. An additional or alternative CQI function 108 may be provided anywhere along the data recovery path (blocks 90 through 106) to monitor signal-to-noise ratios, error rates, and like to derive information bearing on individual or overall channel quality. Additional information on one exemplary way to determine a CQI value is provided in co-assigned application Ser. No. 60/329,511, filed Oct. 17, 2001, which is incorporated herein by reference in its entirety.

Figure 6:
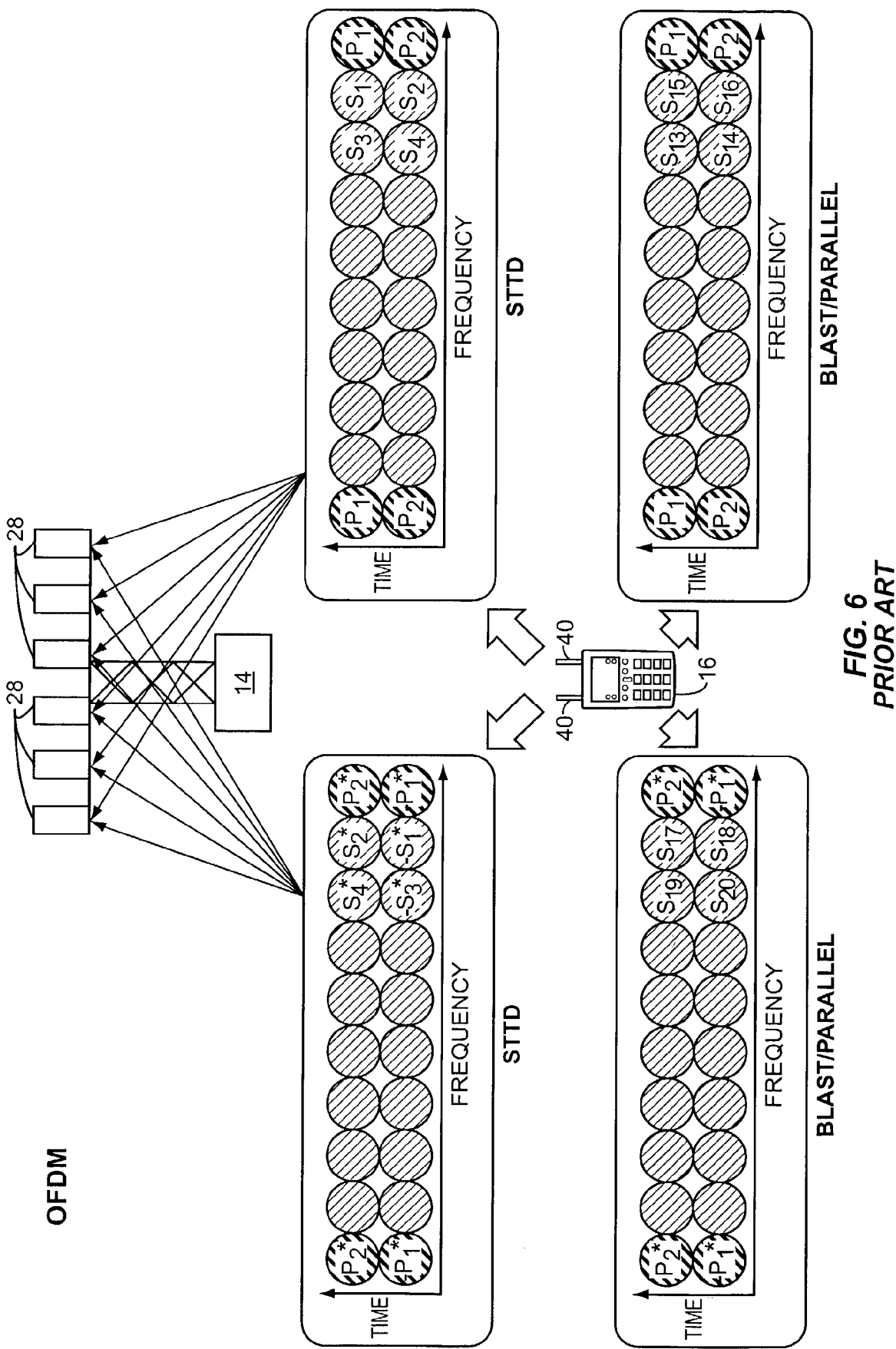
FIG. 6 illustrates a multiple input multiple output (MIMO) communication scheme according to the prior art.

Referring now to FIG. 6, an existing multiple input multiple output (MIMO) transmission scheme of an existing Nortel Networks Limited OFDM architecture is illustrated. In this infrastructure, a mobile terminal 16 has two transmission paths leading to two antennas 40, which will transmit signals to the antennas 28 of the base station 14. FIG. 6 illustrates two transmission techniques. The first uses space-time transmit diversity (coding), while the second uses BLAST or like parallel transmission technique. In both techniques, a block of OFDM sub-carriers in the time-frequency domain is allocated to a single mobile terminal 16 at any given time. Within this block of sub-carriers, certain sub-carriers will be used as pilots, while others are used to transmit data. The pilot information is represented as $P_x$, which represents pilot data capable of being processed to provide a conjugate $T_x^*$ and a negative complex conjugate $-P_x^*$. Similarly, data for transmission by a data sub-carrier can be represented as the actual data $S_x$, a complex conjugate $S_x^*$, or a negative complex conjugate $-S_x^*$. Data, conjugates, and negative complex conjugates are used for space-time transmit diversity coding, as will be recognized by those skilled in the art.

In existing MIMO systems, the base station 14 will assign different pilot information $P_1$, $P_2$ and corresponding sub-carriers for transmitting the pilot information to the mobile terminal 16. In both the STTD and BLAST transmission techniques, STTD coding is implemented across each of the transmission paths in the mobile terminal 16. As such, the pilot information is processed and provided in the sub-carriers assigned by the base station 14 for the group of sub-carriers, as illustrated. Further, any data to be transmitted to the base station 14 from the mobile terminal 16 is provided in all or select ones of the remaining sub-carriers in the group of sub-carriers using STTD coding wherein redundant versions of the data are coded and transmitted from the different antennas 40 of the mobile terminal 16, or using the BLAST technique wherein each antenna 40 transmits different data. Further information regarding STTD and BLAST techniques is provided in U.S. patent application Ser. No. 09/977,540 filed Oct. 15, 2001, Ser. No. 10/251,935 filed Sep. 20, 2002, Ser. No. 10/261,739 filed Oct. 1, 2002, and Ser. No. 10/263,268 filed Oct. 2, 2002, the disclosures of which are incorporated herein by reference in their entireties.

Providing a MIMO architecture with mobile terminals 16 having multiple transmit paths can increase channel capacity by allowing multiple users to share the same channels, increase data rates, or a combination thereof. Unfortunately, equipping mobile terminals 16 with multiple transmission paths significantly increases the cost and complexity of the mobile terminals 16. The present invention provides a way for mobile terminals 16 with a single transmission path to cooperate with one another under the control of the base station 14 to provide a virtual MIMO environment. Notably, this virtual MIMO environment can readily involve mobile terminals 16 having multiple transmission paths and antennas.

Figure 7:
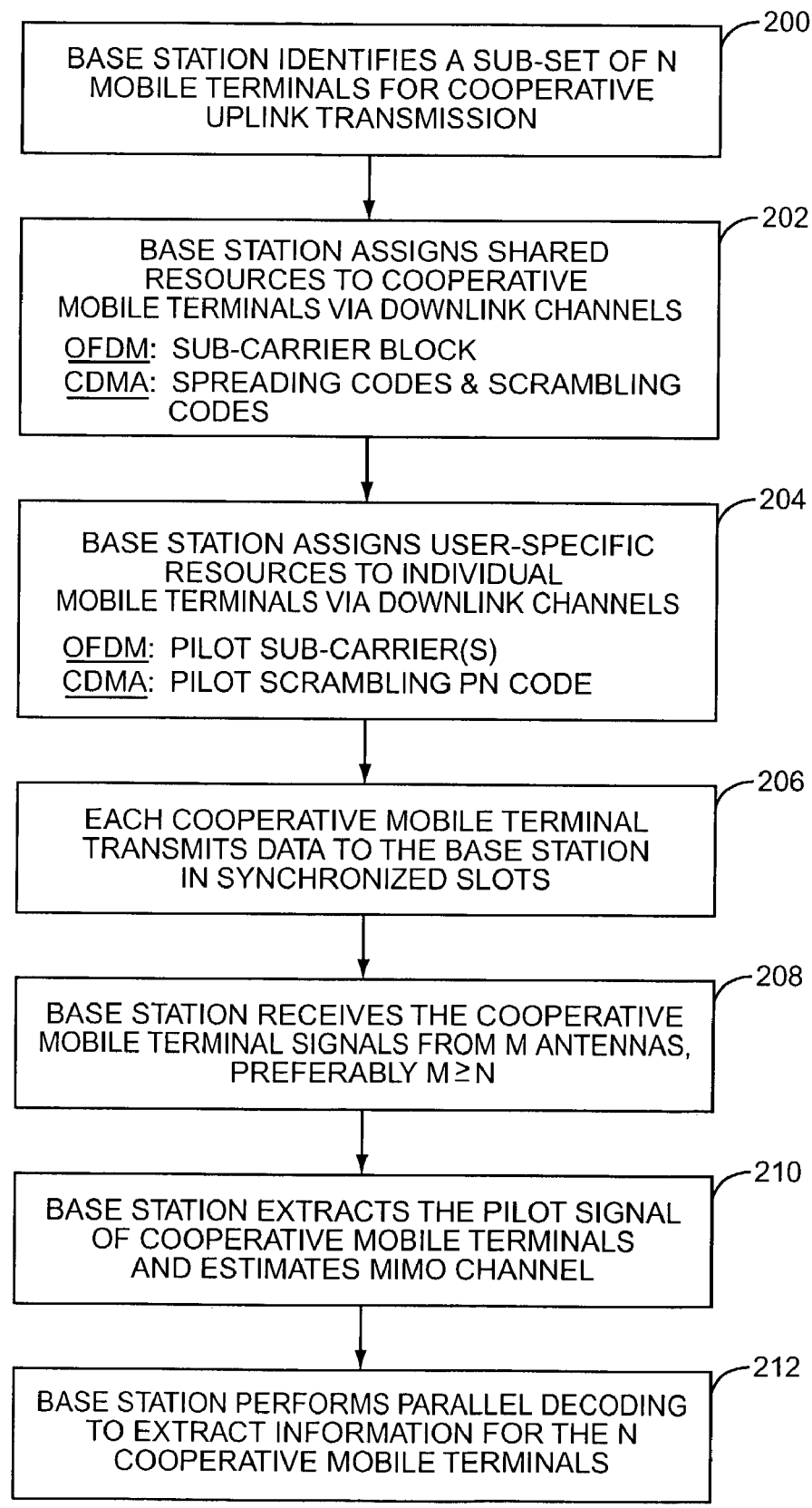
FIG. 7 is a flow diagram representing the basic operation of one embodiment of the present invention.

The flow diagram of FIG. 7 provides an overview of the present invention. Initially, the base station 14 identifies a sub-set of N mobile terminals 16 to cooperate with one another during uplink transmissions (block 200). Next, the base station 14 will assign shared resources to each of the cooperating mobile terminals 16 via downlink channels (block 202). For an OFDM embodiment, the shared resources will include a common sub-carrier block, which is the group of sub-carriers in the time-frequency domain that the mobile terminal 16 will use for transmission. Each of the cooperating mobile terminals 16 will transmit information using the common sub-carrier block at the same time. For a CDMA environment, the base station 14 will assign common spreading and scrambling codes for each of the cooperating mobile terminals 16 to use for transmission of data during a defined period or slot.

Next, the base station 14 will assign user-specific resources to the individual mobile terminals 16 in the group via the downlink channels (block 204). For OFDM, the user-specific resources are the pilot sub-carriers within the shared sub-carrier block. For CDMA, the user-specific resource is a unique pilot PN code, used for scrambling or spreading the information to be transmitted.

Once assigned the shared and user-specific resources, each mobile terminal 16 in the cooperating group will transmit data to the base station 14 in synchronized time slots using the shared resources and user-specific pilots (block 206). The base station 14 will receive the transmitted signals from the mobile terminals 16 at each of its M antennas 40 (block 208) and extract the pilot signals for each of the mobile terminals 16 to help identify the mobile terminals 16 transmitting information, as well as estimate the channel conditions for the MIMO channel (block 210). Finally, the base station 14 will decode the received signals to extract the data or information transmitted by each of the cooperating mobile terminals 16 (block 212).

Turning now to FIGS. 8A and 8B, a communication environment having two mobile terminals 16, referred to as user elements 1 and 2 (UE1 and UE2), is provided. In FIG. 8A, for the same OFDM sub-carrier group, each of the mobile terminals UE1 and UE2 transmits information via the same sub-carrier group at the same time. Each mobile terminal UE1 and UE2 will transmit its own data, yet will use pilot information provided by the base station 14 to provide a virtual MIMO environment. In essence, UE1 and UE2 will emulate a single user element having two transmission paths and two antennas 40, by transmitting data over the same group of sub-carriers and careful use of pilot placement. In particular, the illustrated sub-carrier block includes ten sub-carriers over two time periods for a total of twenty allocated sub-carriers. The sub-carriers on the ends are reserved for pilot information, and as such, during the first time period mobile terminal UE2 may provide pilot data $P_1$ in the rightmost sub-carrier, while mobile terminal UE1 will provide the same pilot data $P_1$ in the leftmost sub-carrier. For the next time period, mobile terminal UE2 will provide pilot data $P_2$ in the leftmost sub-carrier, while mobile terminal UE1 provides the pilot data $P_2$ in the rightmost sub-carrier. As such, the pilot information provided by both of the mobile terminals UE1 and UE2 do not interfere with one another, and provide the necessary pilot information to allow decoding of the transmitted information as if it were simultaneously transmitted from a single mobile terminal 16 having multiple transmission paths and antennas 40.

FIG. 8B illustrates a more complex configuration wherein STTD coding is used for the pilot sub-carriers and the sub-carrier group. Use of the STTD coding increases the robustness of the pilot information and increases the likelihood of a proper recognition of the information by the base station 14. Again, the remaining sub-carriers can be used to transmit data for the respective mobile terminals UE1 and UE2 at the same time. The base station 14 will use the necessary diversity of the coding logic to recover the transmitted data and recognize from where the data was transmitted in traditional fashion, as if it were simultaneously transmitted from a MIMO-equipped mobile terminal 16.

Figure 9A:
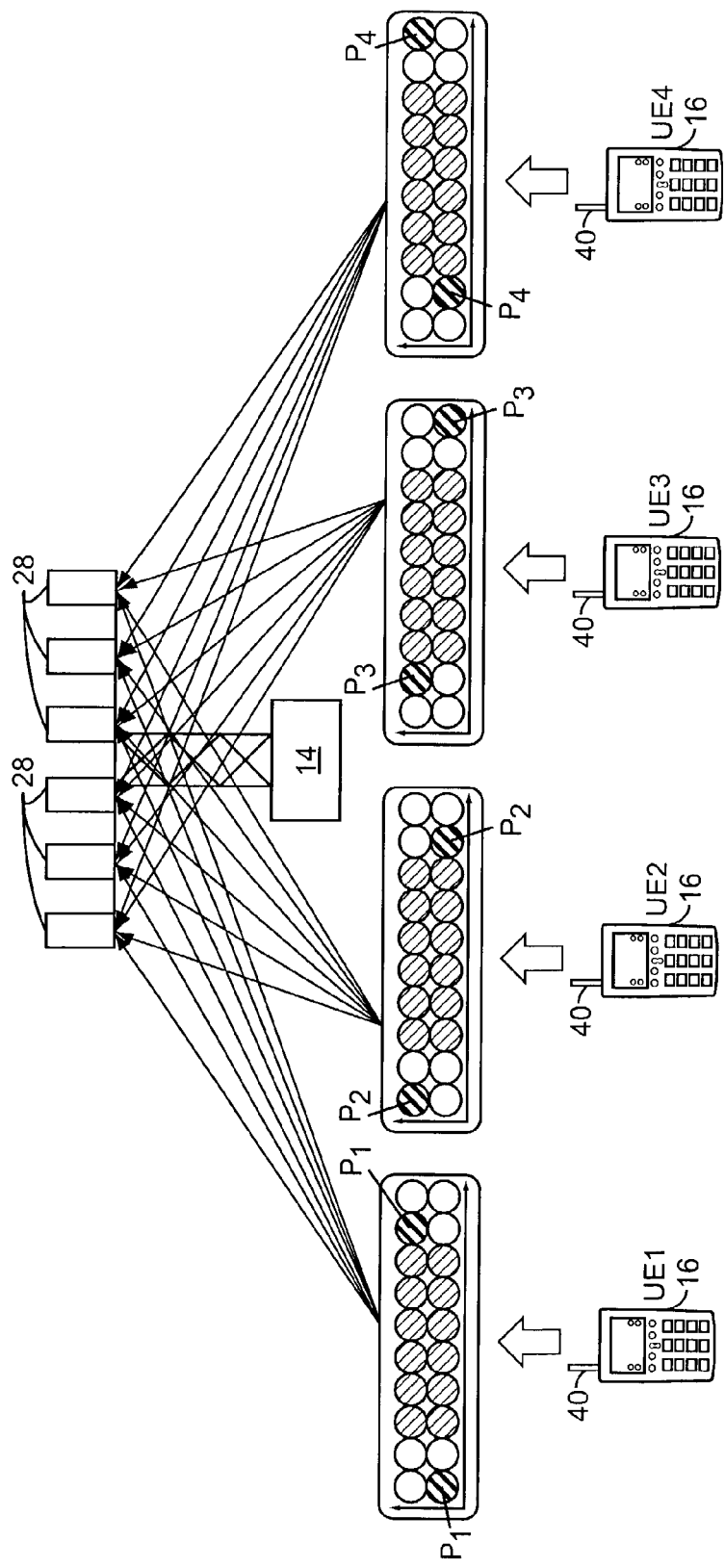
Figure 9A:
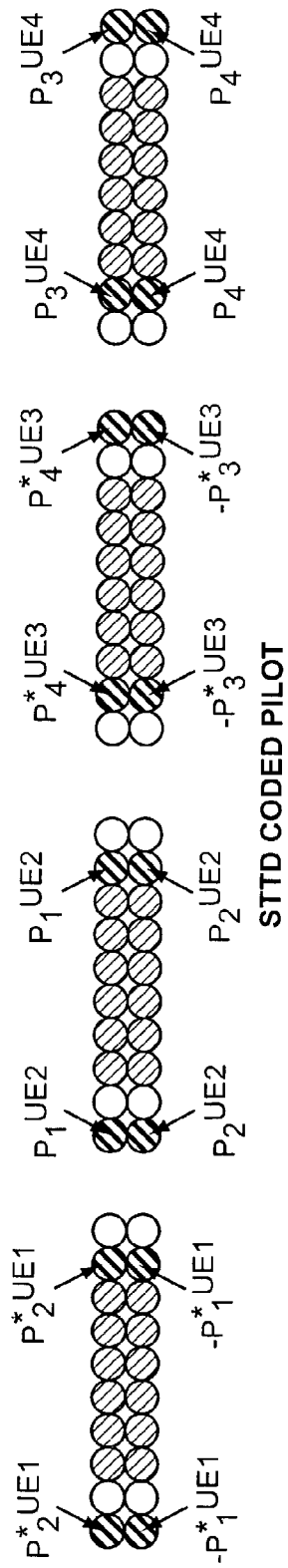

FIGS. 9A and 9B illustrate an OFDM environment wherein four mobile terminals 16, UE1-UE4, are identified by the base station 14 to cooperate with one another to provide a virtual MIMO environment. FIG. 9A depicts the use of basic pilot information $P_1$-$P_4$ for use over eight sub-carriers in the identified group of sub-carriers. FIG. 9B illustrates an embodiment wherein the pilot information is encoded using STTD.

FIGS. 10A and 10B illustrate an environment wherein mobile terminal UE1 is MIMO compliant in that it has two transmission paths and antennas 40, and is assigned to cooperate with mobile terminals UE2 and UE3 to provide a virtual MIMO environment corresponding to four transmission paths and four antennas 40. FIG. 10A illustrates basic pilot information assignment, whereas FIG. 10B uses STTD coding for the pilot information.

Figure 11:
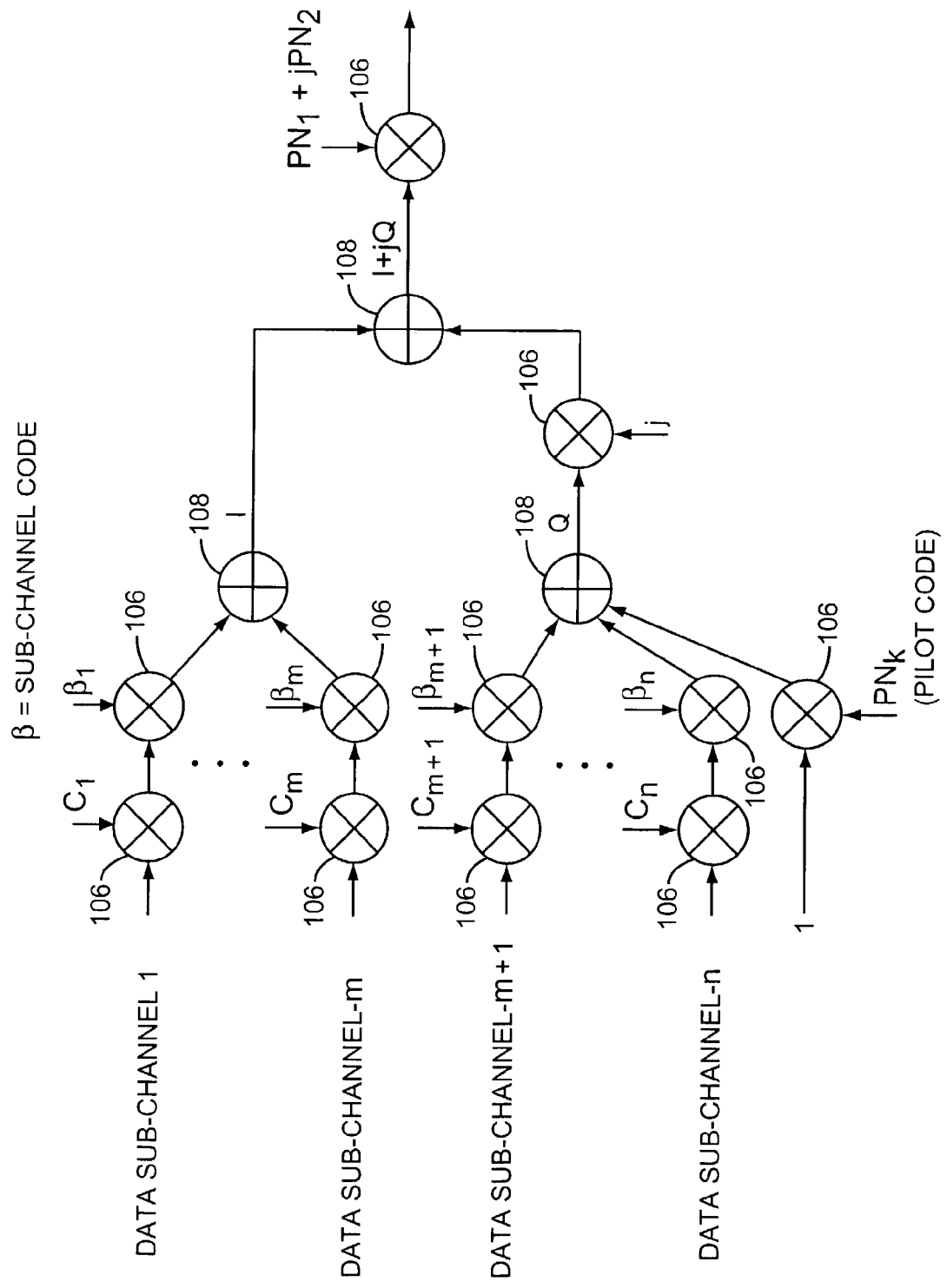
FIG. 11 illustrates a first synchronous CDMA virtual MIMO environment according to the present invention.

As noted, the present invention is applicable to many multiple access environments, including CDMA, and preferably synchronous CDMA. In such an embodiment, different spreading or scrambling codes are used to define shared and user-specific resources. As illustrated in FIG. 11, a given mobile terminal 16 may support numerous sub-channels for transmitting data 106 within the CDMA infrastructure, wherein each sub-channel is defined with a unique sub-channel PN code, $\beta_x$. In this embodiment, the shared resources include spreading codes for each of the sub-channels $C_x$, wherein the corresponding sub-channels in each mobile terminal 16 have the same spreading code. Further, the overall scrambling code for all of the sub-channels for a given mobile terminal 16 is the same for all of the mobile terminals 16 in the group. Thus, the shared resources are the spreading and scrambling codes. The user-specific resource is again related to the pilot signal, wherein each mobile terminal 16 in the group will be assigned a unique pilot code, $PN_k$, which will be used in some fashion to spread all or a portion of the signal to be transmitted.

In the illustrated embodiment, the data 106 for sub-channels 1-m are successively spread by spreading codes $C_1$-$C_m$ and $\beta_1$-$\beta_m$ and added together to form an in-phase signal (I). Similarly, the data 106 for sub-channels m+1 through n are successively spread by spreading codes $C_{m+1}$ through $C_n$ and $\beta_{m+1}$ through $\beta_n$, and added to a pilot code to form a quadrature phase signal (Q). The quadrature phase signal is shifted 90 degrees (j) and added with the in-phase signal (I) before being scrambled by a scrambling code $PN_1+jPN_2$. Thus, the data spreading and scrambling codes are common within the group of mobile terminals, and the transmitted signals vary from each other due to the incorporation of the pilot code $PN_k$.

Figure 12:
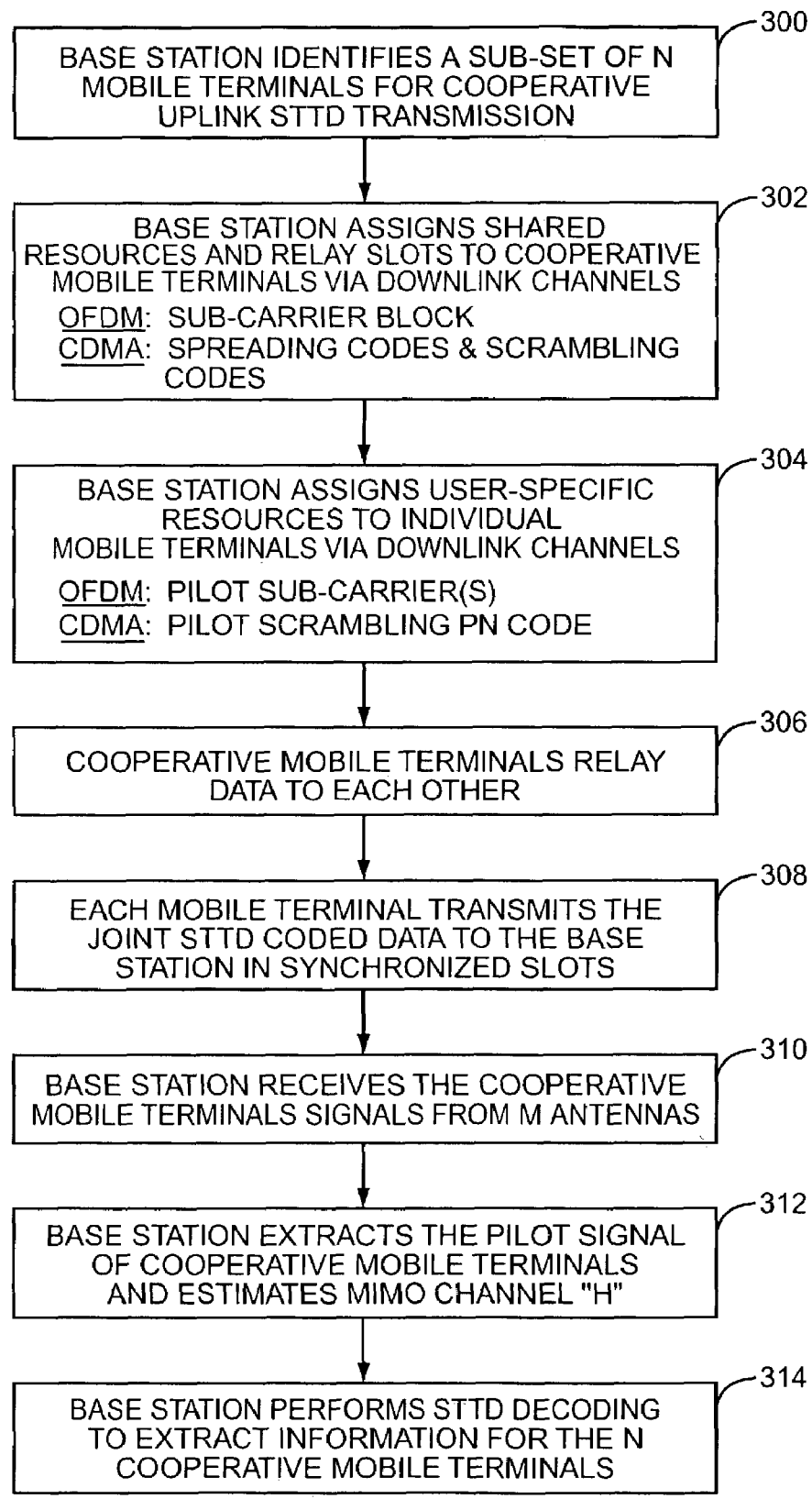
FIG. 12 is a flow diagram representing the basic operation of a second embodiment of the present invention.

In the embodiments described thus far, each of the mobile terminals 16 transmits only its own data, although the data may be encoded in any number of ways. For the following embodiments, the mobile terminals 16 within a cooperating group of mobile terminals 16 are capable of transmitting their data directly between each other and use various encoding techniques to transmit data to the base stations 14. Notably, the data transmitted from any given mobile terminal 16 to a base station 14 may include data corresponding to the mobile terminal 16 transmitting the data or data received from another mobile terminal 16 in the group of mobile terminals 16. A basic overview of the process is provided in FIG. 12.

Initially, the base station 14 will identify a sub-set of mobile terminals 16 that will cooperate with one another to provide uplink transmission to implement a virtual MIMO environment (block 300). Preferably, STTD encoding will be used for the uplink transmission. Next, the base station 14 will assign shared resources and relay slots to the cooperating mobile terminals 16 via downlink channels (block 302). The relay slots are time periods in which the mobile terminals 16 can transmit their information to other mobile terminals 16 in the group. The shared resources for OFDM may be a sub-carrier block defining the group of sub-carriers in a time-frequency domain, wherein CDMA shared resources are preferably spreading and scrambling codes used to spread and scramble the data to be transmitted.

The base station 14 will then assign user-specific resources to the individual mobile terminals 16 in the group via downlink channels (block 304). Preferably, the user-specific resources identify pilot information and sub-carriers in the assigned sub-carrier block for an OFDM configuration, or pilot scrambling or spreading PN codes for a CDMA environment.

Next, the cooperating mobile terminals 16 will relay data to each other (block 306). The mobile terminals 16 will then encode the data in a defined manner, preferably using STTD coding, and transmit the joint, STTD coded data to the base station 14 in synchronized time slots (block 308). The base station 14 will receive the signals from the cooperating mobile terminals 16 from the M antennas 28 (block 310), extract the pilot signals, estimate the MIMO channels (block 312), and perform STTD decoding to extract the information transmitted from the cooperating mobile terminals 16 (block 314).

The transmission of data, be it from the mobile terminal 16 at which the data originated or received from a cooperating mobile terminal 16 in the group, is encoded and transmitted to the base stations 14, which are able to decode the transmitted data and associate the data with the mobile terminal 16 at which it originated. This can be done because the base station 14 controls how the information is relayed and transmitted from the various mobile terminals 16, and will essentially reverse the process upon transmission by the mobile terminal 16.

The relaying of information between the mobile terminals 16 can be accomplished in many ways. In general, the information can be relayed between mobile terminals 16 using the same resources used to facilitate communications between the mobile terminal 16 and the base station 14 (in-band) or using resources other than those required for communications between the base station 14 and the mobile terminal 16 (out-of-band). For in-band or out-of-band relays, the mobile terminals 16 are preferably configured to directly communicate with one another in a manner scheduled by the base station 14. An exemplary out-of-band configuration is depicted in FIG. 13A, wherein uplink and downlink frequency resources ($F_1$ and $F_2$) are reserved for communications between the base station 14 and the mobile terminals 16, and a separate relay frequency resource ($F_3$) is used to facilitate communications between the mobile terminals 16. As such, communications between mobile terminals 16 can occur at the same time as communications between the base station 14 and one or more of the mobile terminals 16. FIGS. 13B and 13C illustrate one exemplary relay procedure for out-of-band embodiments.

Regardless of communications with the base station 14, the mobile terminals 16 will be assigned a given time slot for transmitting data to some or all of the mobile terminals 16 in the group. For example, during a first time slot, user element 1 will transmit (Tx) its data to be shared to the other mobile terminals 16, user element 2 through user element 9. During a second time slot, user element 2 will transmit its data to be shared to the other mobile terminals, user element 1 and user elements 3-9, which will receive (Rx) the information and process it accordingly for subsequent transmission in a direct or encoded form to the base station 14.

Figure 14:
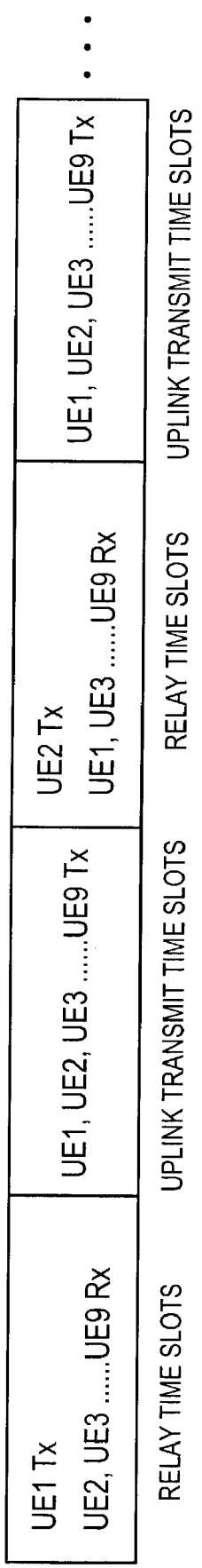
FIG. 14 represents in-band relay of information between mobile terminals according to a second embodiment of the present invention.

FIG. 14 illustrates an in-band embodiment, wherein the same resources used for communications between the base station 14 and the mobile terminals 16 are used to relay data directly between the mobile terminals 16. In this embodiment, the resources for relaying information and uplink communications from the mobile terminal 16 to the base station 14 share the same resources. Accordingly, the resources are divided into relay time slots and uplink time slots. As an example, mobile terminal UE1 will transmit to all the other mobile terminals 16 (UE2-UE9). During a subsequent uplink transmit time slot, all of the mobile terminals 16 (UE1-UE9) will transmit data to the base station 14. During a subsequent relay time slot, another mobile terminal 16 (UE2) will transmit all or select data to the other mobile terminals 16 (UE1, UE3-UE9), and the process will continue such that the mobile terminals 16 will transmit data between each other during relay time slots and transmit data to the base station 14 during uplink transmit time slots. The uplink transmit and relay time slots will likely be subdivided into further time slots for corresponding transmissions to other mobile terminals 16 or the base station 14, as the case may be.

Figure 15:
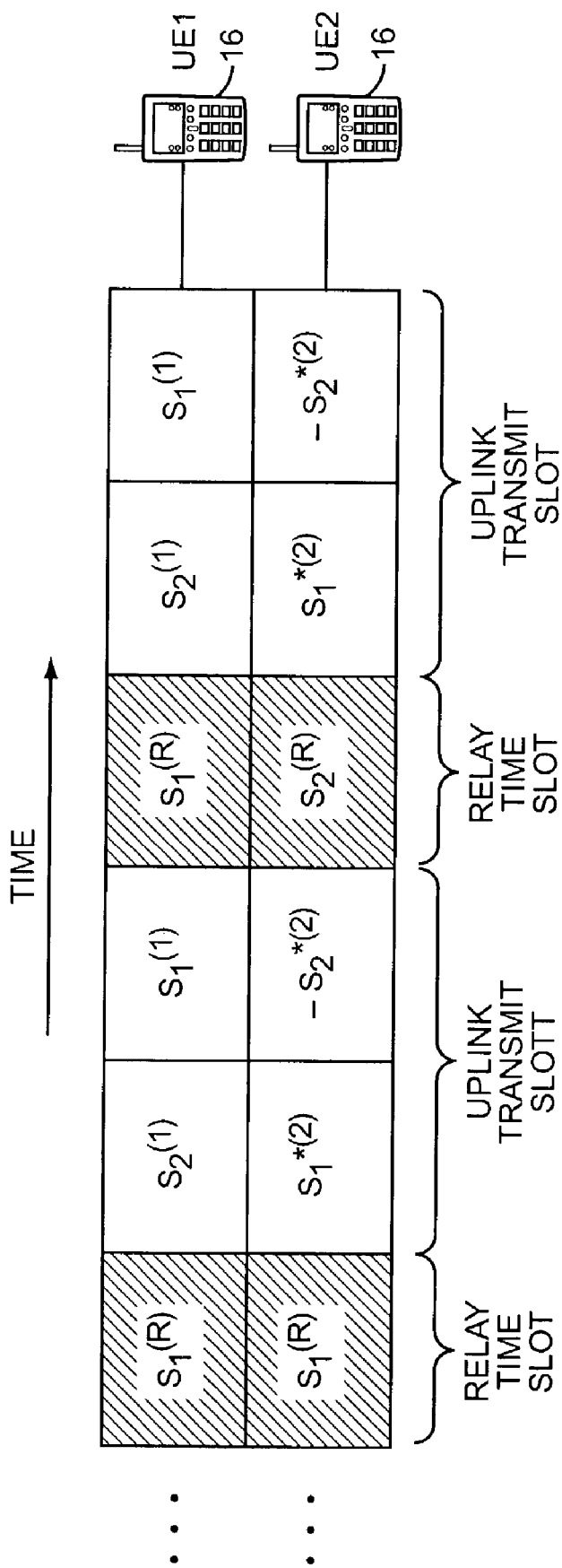
FIGS. 15-17 illustrate various orders of STTD encoding when relating information between mobile terminals according to the present invention.
Figure 16:
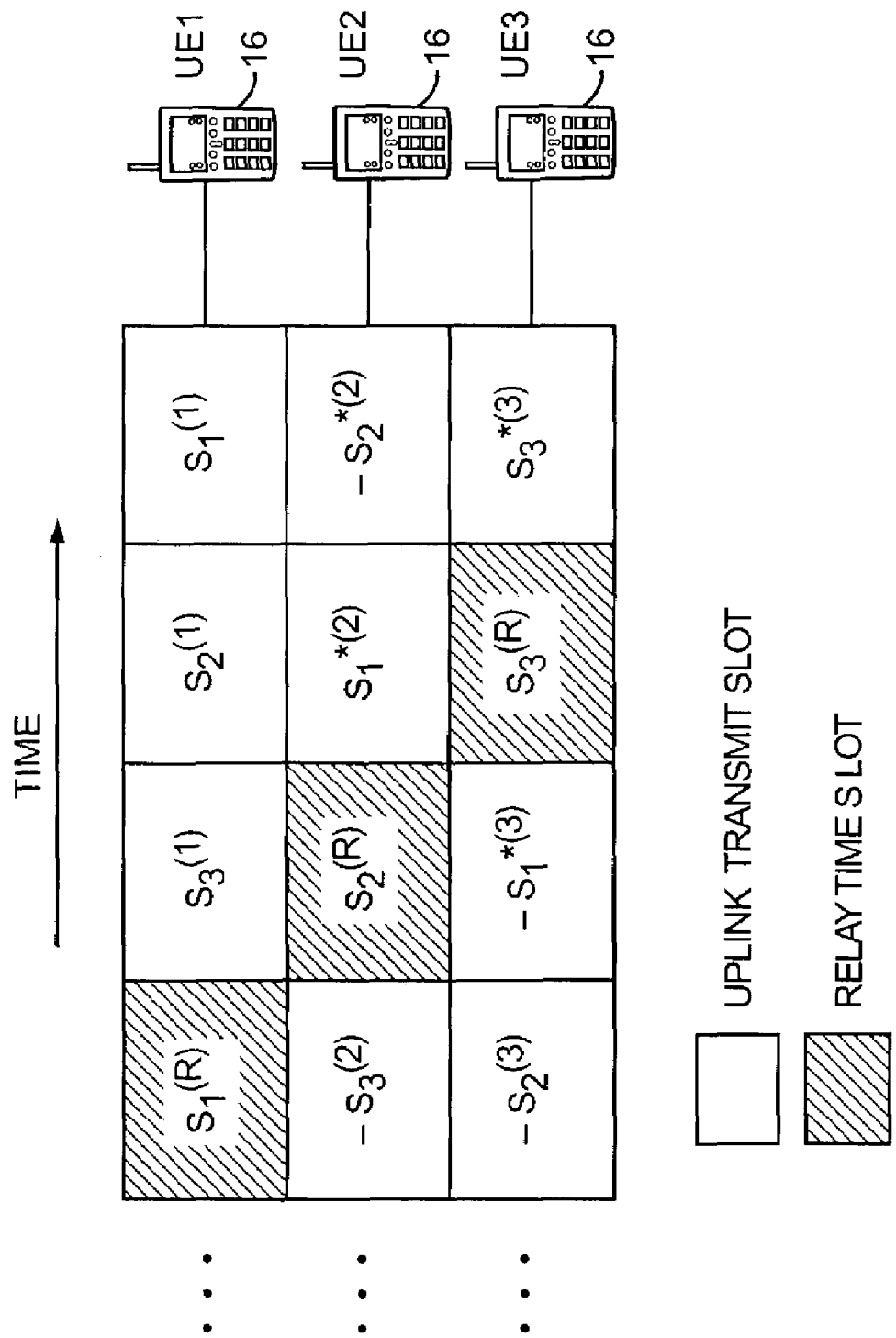
Figure 17:
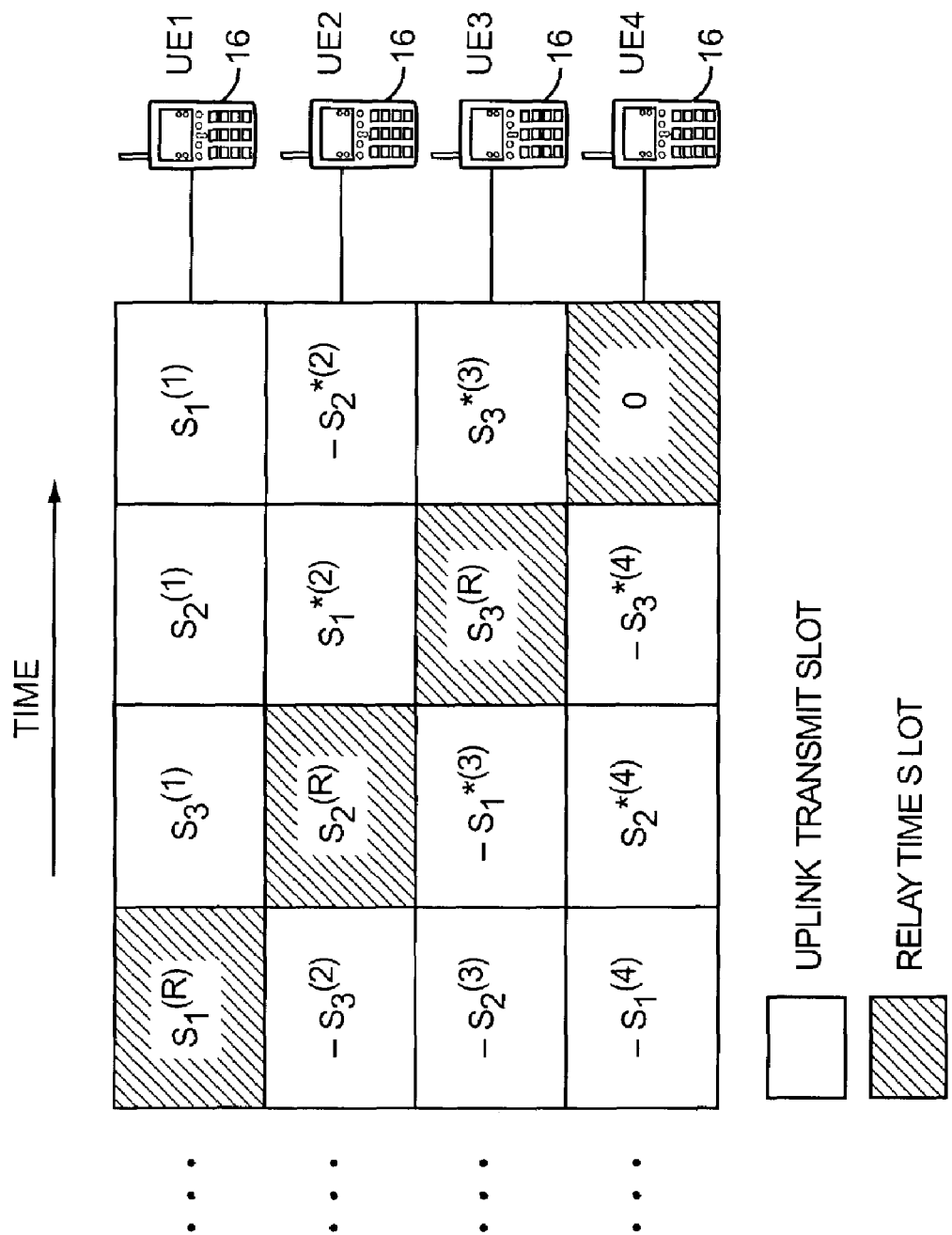

FIGS. 15-17 illustrate when information is relayed and how that information may be encoded by the various mobile terminals 16 to provide for virtual, STTD MIMO transmissions. With reference to FIG. 15, mobile terminal UE1 and mobile terminal UE2 relay their information to each other, and during the subsequent two uplink transmission time slots, mobile terminal UE1 and mobile terminal UE2 will transmit STTD encoded versions of both of their data to the base station 14. In particular, UE1 during a first uplink transmission time slot will transmit $S_2^{(1)}$, which represents unencoded data from mobile terminal UE2, while mobile terminal UE2 will transmit the complex conjugate, $S_1^{*(2)}$ of mobile terminal UE1's data, $S_1$. During the second uplink transmission time slot, mobile terminal UE1 will transmit its data $S_1^{(1)}$, while mobile terminal UE2 will transmit the negative complex conjugate of its data, $-S_2^{*(2)}$, and the process continues.

FIGS. 16 and 17 illustrate third and fourth order transmit diversity schemes wherein the relay time slots for each given mobile terminal 16 are not necessarily co-aligned, such that certain mobile terminals 16 may be transmitting to the base station 14 using certain resources and other mobile terminals 16 are relaying data to each other using other resources.

From the above, the present invention provides an effective way to create a virtual MIMO transmission system using mobile terminals 16 that have only one transmit path and antenna 40. This is accomplished by assigning mobile terminals 16 to a group and assigning certain shared resources and user-specific resources to those mobile terminals 16 in the group. In a synchronized fashion, the mobile terminals 16 will provide uplink transmission in concert, as if they were a single entity having multiple transmission paths and antennas. Preferably, the shared resources bear on how the data is transmitted, and the user-specific resources relate to pilot signals. The data transmitted may be encoded in any number of ways, and in one embodiment, the mobile terminals 16 may relay their information to each other, such that uplink transmissions can incorporate STTD decoding or other space-time codes. The invention is applicable to virtually any multiple access technology, including OFDM, TDMA, and CDMA, preferably synchronous CDMA.

Those skilled in the art will recognize improvements and modifications to the preferred embodiments of the present invention. All such improvements and modifications are considered within the scope of the concepts disclosed herein and the claims that follow.

What is claimed is:

1. A method for facilitating cooperative uplink transmission comprising:
   a) identifying a group of mobile terminals to provide cooperative uplink transmissions;
   b) assigning a common resource via downlink transmissions to each mobile terminal in the group of mobile terminals, such that the common resource for each mobile terminal is the same and used for uplink transmission; and
   c) assigning a different unique resource via downlink transmissions to each mobile terminal, such that the unique resource for each of the mobile terminals is different and used for the uplink transmission, wherein each of the mobile terminals in the group of mobile terminals concurrently uses the common resource and a corresponding unique resource during the uplink transmissions to provide a virtual multiple input multiple output uplink transmission.

2. The method of claim 1 wherein the common resource is an OFDM sub-carrier block in the time and frequency domain, such tat the mobile terminals will concurrently transmit data in certain sub-carriers in the sub-carrier block.

3. The method of claim 2 wherein each unique resource for each mobile terminal includes a sub-carrier for a unique pilot signal assigned to at least one of the sub-carriers in the sub-carrier block, such that no two mobile terminals in the group of mobile terminals transmit the unique pilot information in a common sub-carrier.

4. The method of claim 2 wherein each unique resource for each mobile terminal includes a sub-carrier for a unique pilot signal, which is created in part from pilot information for at least one other mobile terminal in the group of mobile terminals and assigned to at least one of the sub-carriers in the sub-carrier block.

5. The method of claim 4 wherein the unique pilot signal for each mobile terminal is created using STTD coding from the pilot information for a corresponding mobile terminal and the pilot information for at least one other mobile terminal in the group of mobile terminals.

6. The method of claim 1 wherein the common resource is at least one of a CDMA spreading code and a CDMA scrambling code, such that the mobile terminals will concurrently transmit data spread by at least one of the CDMA spreading and CDMA scrambling codes.

7. The method of claim 6 wherein each unique resource is a unique code, such that the mobile terminals will concurrently transmit data further spread or scrambled by the unique code.

8. The method of claim 1 further comprising concurrently receiving the uplink transmission from each of the mobile terminals in the group of mobile terminals via a plurality of antennas.

9. The method of claim 1 wherein at least one of the mobile terminals in the group of mobile terminals has a plurality of antennas and a plurality of unique resources are assigned to the at least one mobile terminal having the plurality of antennas.

10. The method of claim 1 wherein the common resource is used for transmitting data and the unique resources we used for transmitting pilot information.

11. The method of claim 1 wherein data transmitted from each of the mobile terminals includes data corresponding to the mobile terminal transmitting the data.

12. The method of claim 11 further comprising receiving the uplink transmission from the mobile terminals via a plurality of antennas and decoding the data transmitted from each of the mobile terminals using parallel decoding.

13. The method of claim 1 wherein data in the uplink transmission for a mobile terminal in the group of mobile terminals includes data from another mobile terminal in the group of mobile terminals.

14. The method of claim 13 wherein the data is encoded using STTD encoding.

15. The method of claim 14 further comprising receiving the uplink transmission from the mobile terminals via a plurality of antennas and decoding the data transmitted from each of the mobile terminals using STTD decoding.

16. A method for facilitating cooperative uplink transmission comprising:
   a) receiving from a servicing base station a common resource to use for uplink transmission, the common resource also assigned to others of a group of mobile terminals;
   b) receiving from the servicing base station a unique resource to use for the uplink transmission, a different unique resource being assigned to the other mobile terminals in the group of mobile terminals; and
   c) transmitting information to the servicing base station using the common and unique resource wherein each of the mobile terminals in the group of mobile terminals concurrently uses the common resource and the different unique resource during the uplink transmission to provide a virtual multiple input multiple output uplink transmission.

17. The method of claim 16 wherein the common resource is an OFDM sub-carrier block in the time and frequency domain, such that the mobile terminals will concurrently transmit data in certain sub-carriers in the sub-carrier block.

18. The method of claim 17 wherein each unique resource for each mobile terminal includes a sub-carrier for a unique pilot signal assigned to at least one of the sub-carriers in the sub-carrier block, such that no two mobile terminals in the group of mobile terminals transmit the unique pilot information in a common sub-carrier.

19. The method of claim 17 wherein each unique resource for each mobile terminal includes a sub-carrier for a unique pilot signal, and further comprising creating the unique pilot signal in part from pilot information for at least one other mobile terminal in the group of mobile terminals and assigned to at least one of the sub-carriers in the sub-carrier block.

20. The method of claim 19 wherein the unique pilot signal is created using STTD coding from first pilot information and the pilot information for the at least one other mobile terminal in the group of mobile terminals.

21. The method of claim 16 wherein the common resource is at least one of a CDMA spreading code and a CDMA scrambling code, and further comprising spreading data to be transmitted by at least one of the CDMA spreading and CDMA scrambling codes.

22. The method of claim 21 wherein each unique resource is a unique code, and further comprising spreading or scrambling the data further with the unique code.

23. The method of claim 16 wherein the common resource is used for transmitting data and the unique resource is used for transmitting pilot information transmitted with the data.

24. The method of claim 16 further comprising receiving mobile terminal data from another mobile terminal in the group of mobile terminals wherein the information to be transmitted includes the mobile terminal data.

25. The method of claim 24 wherein the mobile terminal data and data is encoded using STTD encoding prior to being transmitted.

26. The method of claim 16 further comprising transmitting data to at least one of the mobile terminals in the group of mobile terminals.

27. The method of claim 26 wherein the data is transmitted to the at least one of the mobile terminals in the group of mobile terminals using communication resources other than those for the uplink or downlink transmission with the servicing base station.

28. The method of claim 26 wherein the data is transmitted to the at least one of the mobile terminals in the group of mobile terminals using communication resources used for the uplink or downlink transmission with the servicing base station.

29. The method of claim 28 wherein information to be transmitted to the servicing base station is transmitted during a first time period and the data is transmitted to the at least one of the mobile terminals during a second time period.

30. A base station for facilitating cooperative uplink transmission comprising transmit, receive, and control logic cooperatively adapted to:
 a) identify a group of mobile terminals to provide cooperative uplink transmission;
 b) assign a common resource via downlink transmissions to each of the mobile terminals in the group of mobile terminals, such that the common resource for each mobile terminal is the same and used for uplink transmission; and
 c) assign a different unique resource via downlink transmissions to each mobile terminal, such that the unique resource for each of the mobile terminals is different and used for the uplink transmission, wherein each of the mobile terminals in the group of mobile terminals concurrently uses the common resource and a corresponding unique resource during the uplink transmission to provide a virtual multiple input multiple output uplink transmission.

31. The base station of claim 30 wherein the common resource is an OFDM sub-carrier block in the time and frequency domain, such that the mobile terminals will concurrently transmit data in certain sub-carriers in the sub-carrier block.

32. The base station of claim 31 wherein each unique resource for each mobile terminal includes a sub-carrier for a unique pilot signal assigned to at least one of the sub-carriers in the sub-carrier block, such that no two mobile terminals in the group of mobile terminals transmit the unique pilot information in a common sub-carrier.

33. The base station of claim 31 wherein each unique resource for each mobile terminal includes a sub-carrier for a unique pilot signal, which is created in part from pilot information for at least one other mobile terminal in the group of mobile terminals and assigned to at least one of the sub-carriers in the sub-carrier block.

34. The base station of claim 33 wherein the unique pilot signal for each mobile terminal is created using STTD coding from pilot information for a corresponding mobile terminal and the pilot information for the at least one other mobile terminal in the group of mobile terminals.

35. The base station of claim 30 wherein the common resource is at least one of a CDMA spreading code and a CDMA scrambling code, such that the mobile terminals will concurrently transmit data spread by at least one of the CDMA spreading and CDMA scrambling codes.

36. The base station of claim 35 wherein each unique resource is a unique code, such that the mobile terminals will concurrently transmit data further spread or scrambled by the unique code.

37. The base station of claim 30 wherein the receive, transmit, and control logic are further adapted to concurrently receive the uplink transmission from each of the mobile terminals in the group of mobile terminals via a plurality of antennas.

38. The base station of claim 30 wherein at least one of the mobile terminals in the group of mobile terminals has a plurality of antennas, and a plurality of unique resources are assigned to the at least one mobile terminal having the plurality of antennas.

39. The base station of claim 30 wherein the common resource is used for transmitting data and the unique resources are used for transmitting pilot information.

40. The base station of claim 30 wherein data transmitted from each of the mobile terminals includes data corresponding to the mobile terminal transmitting the data.

41. The base station of claim 40 wherein the receive, transmit, and control logic are further adapted to receive the uplink transmission from the mobile terminals via a plurality of antennas and decode the data transmitted from each of the mobile terminals using parallel decoding.

42. The base station of claim 30 wherein data in the uplink transmission for a mobile terminal in the group of mobile terminals includes data from another mobile terminal in the group of mobile terminals.

43. The base station of claim 42 wherein the data is encoded using STTD encoding.

44. The base station of claim 43 wherein the receive, transmit, and control logic are further adapted to receive the uplink transmission from the mobile terminals via a plurality of antennas and decoding the data transmitted from each of the mobile terminals using STTD decoding.

45. A mobile terminal for facilitating cooperative uplink transmission comprising receive, transmit, and control logic adapted to:
 a) receive from a servicing base station a common resource to use for uplink transmission, the common resource also assigned to others mobile terminals in a group of mobile terminals;
 b) receive from the servicing base station a unique resource to use for the uplink transmission, a different unique resource being assigned to the each mobile terminal; and
 c) transmit information to the servicing base station using the common and unique resources wherein each of the mobile terminals in the group of mobile terminals concurrently uses the common resource and the different unique resource during the uplink transmission to provide a virtual multiple input multiple output uplink transmission.

46. The mobile terminal of claim 45 wherein the common resource is an OFDM sub-carrier block in the time and frequency domain, such that the mobile terminals will concurrently transmit data in certain sub-carriers in the sub-carrier block.

47. The mobile terminal of claim 46 wherein each unique resource for each mobile terminal includes a sub-carrier for a unique pilot signal assigned to at least one of the sub-carriers in the sub-carrier block, such that no two mobile terminals in the group of mobile terminals transmit the unique pilot information in a common sub-carrier.

48. The mobile terminal of claim 46 wherein each unique resource for each mobile terminal includes a sub-carrier for a unique pilot signal, and wherein the receive, transmit, and control logic are further adapted to create the unique pilot signal in part from pilot information for at least one other mobile terminal in the group of mobile terminals and assigned to at least one of the sub-carriers in the sub-carrier block.

49. The mobile terminal of claim 48 wherein the unique pilot signal is created using STTD coding from first pilot information and the pilot information for the at least one other mobile terminal in the group of mobile terminals.

50. The mobile terminal of claim 45 wherein the common resource is at least one of a CDMA spreading code and a CDMA scrambling code, and wherein the receive, transmit, and control logic are further adapted to spread data to be transmitted by at least one of the CDMA spreading and CDMA scrambling codes.

51. The mobile terminal of claim 50 wherein each unique resource is a unique code, and wherein the receive, transmit, and control logic are further adapted to spread or scramble the data further with the unique code.

52. The mobile terminal of claim 45 wherein the common resource is used for transmitting data and the unique resource is used for transmitting pilot information transmitted with the data.

53. The mobile terminal of claim 45 wherein the receive, transmit, and control logic are further adapted to receive mobile terminal data from another mobile terminal in the group of mobile terminals, and the information to be transmitted includes the mobile terminal data.

54. The mobile terminal of claim 53 wherein the mobile terminal data and data is encoded using STTD encoding prior to being transmitted.

55. The mobile terminal of claim 45 wherein the receive, transmit, and control logic are further adapted to transmit data to at least one of the mobile terminals in the group of mobile terminals.

56. The mobile terminal of claim 45 wherein the data is transmitted to the at least one of the mobile terminals in the group of mobile terminals using communication resources other than those for the uplink or downlink transmission with the servicing base station.

57. The mobile terminal of claim 45 wherein the data is transmitted to the at least one of the mobile terminals in the group of mobile terminals using communication resources used for the uplink or downlink transmission with the servicing base station.

58. The mobile terminal of claim 57 wherein information to be transmitted to the servicing base station is transmitted during a first time period and the data is transmitted to the at least one of the mobile terminals during a second time period.

* * * * *